(12) United States Patent
Ventelon et al.

(10) Patent No.: US 9,372,284 B2
(45) Date of Patent: Jun. 21, 2016

(54) COPPER-FREE MIRROR HAVING ACRYLIC AND POLYURETHANE PAINT LAYERS FREE OF ALKYD

(75) Inventors: Lionel Ventelon, Jumet (BE); Bruno Cosijns, Jumet (BE)

(73) Assignee: AGC GLASS EUROPE, Brussels (BE)

(*) Notice: Subject to any disclaimer, the term of this patent is extended or adjusted under 35 U.S.C. 154(b) by 47 days.

(21) Appl. No.: 13/994,765

(22) PCT Filed: Dec. 15, 2011

(86) PCT No.: PCT/EP2011/072973
§ 371 (c)(1),
(2), (4) Date: Jun. 17, 2013

(87) PCT Pub. No.: WO2012/080424
PCT Pub. Date: Jun. 21, 2012

(65) Prior Publication Data
US 2013/0271864 A1 Oct. 17, 2013

(30) Foreign Application Priority Data
Dec. 17, 2010 (EP) .................................. 10195565

(51) Int. Cl.
*G02B 1/10* (2015.01)
*C03C 17/36* (2006.01)
*C03C 17/38* (2006.01)
*G02B 5/08* (2006.01)

(52) U.S. Cl.
CPC ............ *G02B 1/105* (2013.01); *C03C 17/3663* (2013.01); *C03C 17/38* (2013.01); *G02B 5/0808* (2013.01)

(58) Field of Classification Search
CPC .... C03C 17/3663; C03C 17/38; G02B 1/105; G02B 5/0808

USPC .......................................................... 359/838
See application file for complete search history.

(56) References Cited

U.S. PATENT DOCUMENTS

| | | | |
|---|---|---|---|
| 2009/0068362 A1 * | 3/2009 | Bahls | 427/305 |
| 2009/0153988 A1 | 6/2009 | Ventelon et al. | |
| 2009/0220689 A1 | 9/2009 | Bahls | |
| 2010/0271694 A1 | 10/2010 | Bamber | |
| 2011/0226234 A1 | 9/2011 | Dros et al. | |
| 2011/0235203 A1 | 9/2011 | Ventelon et al. | |
| 2011/0261473 A1 | 10/2011 | Weisse et al. | |
| 2011/0267713 A1 | 11/2011 | Ventelon et al. | |
| 2012/0114969 A1 * | 5/2012 | Stremsdoerfer | 428/630 |

FOREIGN PATENT DOCUMENTS

| | | |
|---|---|---|
| FR | 2 936 240 | 3/2010 |
| WO | 2009 128988 | 10/2009 |
| WO | WO 2010103125 A1 * | 9/2010 |

OTHER PUBLICATIONS

International Search Report Issued May 23, 2012 in PCT/EP11/072973 Filed Dec. 15, 2011.

* cited by examiner

*Primary Examiner* — Stephone B Allen
*Assistant Examiner* — Ryan Dunning
(74) *Attorney, Agent, or Firm* — Oblon, McClelland, Maier & Neustadt, L.L.P.

(57) ABSTRACT

Mirrors with no copper layer according to the present invention comprise a glass substrate, a silver coating layer provided at a surface of the glass substrate and at least two paint layers covering the silver coating layer, the outermost paint layer comprising a polyurethane resin based paint. They are characterized in that the paint layers are free of alkyd resin and in that the first paint layer closest to the silver coating layer has a thickness of at least 10 μm.

17 Claims, No Drawings

COPPER-FREE MIRROR HAVING ACRYLIC AND POLYURETHANE PAINT LAYERS FREE OF ALKYD

This invention relates to mirrors, in particular for use as solar energy reflectors.

The mirrors of this invention may be used as reflectors in solar energy or heating installations, for example concentrating solar power plants. Such installations use the solar energy to generate heat, which may be converted into electricity or used for steam production. Concentrating solar power plants wherein mirrors according to the present invention may be used comprise, for example, parabolic trough power plants, central tower power plants (also called heliostat power plants), dish collectors and Fresnel reflector power plants. Mirrors according to the present invention may be used in such installations as flat or curved solar energy reflectors. They may be laminated to a supporting sheet or be self-supporting.

The mirrors of this invention may have other applications, for example: domestic mirrors used for example in furniture, wardrobes or bathrooms; mirrors in make-up boxes or kits; mirrors used in the automotive industry, as rear-view mirrors for cars, for example; outdoor mirrors. But this invention remains particularly advantageous in relation to mirrors for use in outdoor applications, e.g. for use as solar energy reflectors.

Domestic mirrors and mirrors for solar applications have generally been produced as follows: a sheet of flat glass (float, soda-lime glass) was first of all polished and then sensitised, typically using an aqueous solution of $SnCl_2$; after rinsing, the surface of the glass was usually activated by means of an ammoniacal silver nitrate treatment, and a silvering solution was then applied in order to form an opaque coating of silver; this silver coating was then covered with a protective layer of copper and then with one or more coats of leaded paint in order to produce the finished mirror. The combination of the protective copper layer and the leaded paint was deemed necessary to provide acceptable ageing characteristics and sufficient corrosion resistance.

More recently, mirrors were developed which dispensed with the need for the conventional copper layer, which could use substantially lead-free paints and yet which still had acceptable or even improved ageing characteristics and corrosion resistance. For example, U.S. Pat. No. 6,565,217 describes embodiments of a mirror with no copper layer which comprises in the order recited: a vitreous substrate; both tin and palladium provided at a surface of the vitreous substrate; a silver coating layer on said surface of the substrate; tin present at the surface of the silver coating layer which is adjacent to an at least one paint layer; and at least one paint layer covering the silver coating layer. Such mirrors provided a significant advance with respect to conventional coppered mirrors.

Mirrors for solar energy reflectors require good ageing properties, for example:
good corrosion resistance: progressive corrosion of portions of the mirrors may reduce the total reflective surface of a concentrating solar power plant and thus the yield of the plant;
good mechanical resistance: solar energy reflectors are often placed in desert environments, where wind and/or sand abrasion may be a problem;
good resistance to ultraviolet degradation: reflectance of the mirrors, in particular energy reflectance (RE), generally decreases over time under UV radiation.

A small reduction in mirror reflectance may be significant to the overall efficiency of a solar power plant. Whilst degraded mirrors may be replaced, this is time consuming and expensive and leads to down time of the plant. Consequently, it would be advantageous to reduce the loss in reflectance of the mirrors over time, by improving their resistance to corrosion, their mechanical resistance and their resistance to UV radiation, whilst preferably using environmental-friendly copper-free and substantially lead-free mirrors.

According to one of its aspects, the present invention provides a mirror as defined by claim 1. Other claims define preferred and/or alternative aspects of the invention.

Mirrors with no copper layer according to the invention comprise a glass substrate, a silver coating layer provided at a surface of the glass substrate and at least two paint layers covering the silver coating layer, the outermost paint layer (i.e. the paint layer furthest from the glass substrate) comprising a polyurethane resin based paint. They are characterised in that the paint layers are free of alkyd resin and in that the first paint layer closest to the silver coating layer has a thickness of at least 10 μm.

The invention provides a mirror, for example for solar energy reflectors, which shows better ageing properties than those of a mirror of identical manufacture containing alkyd and/or without polyurethane based outermost paint and/or with thinner first paint layer. We have found that by providing copper-free mirrors with a polyurethane based outermost paint, without alkyd based paint and with sufficiently thick first paint layer, we could provide mirrors with longer lifetime, increased corrosion and mechanical resistance, and increased resistance to UV radiation.

It is known that UV radiation may deteriorate paints used on the rear side of mirrors. Such deterioration may affect the ability of the paints to protect the mirrors and consequently give mirrors which are less resistant to ageing and corrosion. For this reason, the exposed paint layer of a mirror (i.e. the outermost paint layer) generally includes UV blockers. However UV radiation may also pass through the glass substrate and silver coating layer and attain the paints which are not exposed. With previous mirrors, the copper layer mainly blocked the UV radiation coming from that side of the mirrors. But now, with the coming up of mirrors with no copper layer, we have found that it was necessary to also control the UV radiation coming from the glass-side of the mirrors and avoid that such radiation deteriorates the paints and thus the mirrors.

We have found that by ensuring that the copper-free mirrors do not contain alkyd paints and by combining this feature with an outermost polyurethane based paint layer, we could provide copper-free mirrors with better ageing properties. Moreover by ensuring that the first paint layer closest to the silver coating layer had a thickness of at least 10 μm, we may provide a good compromise between offering a good mechanical and chemical resistance to the mirror and an acceptable cost of production.

Preferably, mirrors according to the invention comprise three layers of paint. The presence of a greater number of paint layers may provide more advanced resistance to ageing and corrosion.

The paint layer(s) other than the outermost paint layer may comprise an acrylic resin based paint or an epoxy resin based paint.

In one embodiment of the invention, the mirror comprises two paint layers: a first paint layer between the silver coating layer and the outermost paint layer comprising an acrylic resin based paint and the outermost paint layer comprising a polyurethane resin based paint. In another preferred embodiment of the invention, the mirror comprises three paint layers: a first paint layer closest to the silver coating layer comprising an acrylic resin based paint, a second paint layer between the first paint layer and the outermost paint layer comprising an acrylic resin based paint and the outermost paint layer comprising a polyurethane resin based paint. In alternative embodiments of the invention, the paint layer(s) comprising an acrylic resin based paint may be replaced by paint layer(s) comprising an epoxy resin based paint. For example, the mirror may comprise three paint layers: a first paint layer closest to the silver coating layer comprising an acrylic resin based paint, a second paint layer between the first paint layer and the outermost paint layer comprising an epoxy resin based paint and the outermost paint layer comprising a polyurethane resin based paint.

In one preferred embodiment of mirrors according to the invention, the paint layers applied over the silver layer are lead-free or substantially lead-free. This is advantageous in that lead is toxic and its avoidance has environmental benefits. Substantially lead-free means herein that the proportion of lead in the paint is significantly less than the proportion of lead in leaded paints conventionally used for mirrors. The proportion of lead in a substantially lead-free paint layer as herein defined is less than 500 mg/m$^2$, preferably less than 400 mg/m$^2$, more preferably less than 300 mg/m$^2$. The proportion of lead in a lead-free paint layer as herein defined is less than 100 mg/m$^2$, preferably less than 80 mg/m$^2$, more preferably less than 60 mg/m$^2$.

Advantageously, when the mirror comprises two paint layers, the first paint layer may have a thickness of at least 15 μm, preferably at least 20 μm, or more preferably at least 25 μm; it may have a thickness of at most 70 μm, preferably at most 55 μm, or more preferably at most 45 μm. The outermost paint layer may have a thickness of at least 10 μm, preferably at least 20 μm, or more preferably at least 25 μm; it may have a thickness of at most 70 μm, preferably at most 55 μm, or more preferably at most 45 μm.

Advantageously, when the mirror comprises three paint layers, the first paint layer, closest to the silver coating layer, may have a thickness of at least 15 μm, preferably at least 20 μm, or more preferably at least 25 μm; it may have a thickness of at most 70 μm, preferably at most 55 μm, or more preferably at most 45 μm. The second paint layer, between the first paint layer and the outermost paint layer, may have a thickness of at least 10 μm, preferably at least 20 μm, or more preferably at least 25 μm; it may have a thickness of at most 70 μm, preferably at most 55 μm, or more preferably at most 45 μm. The outermost paint layer may have a thickness of at least 10 μm, preferably at least 20 μm, or more preferably at least 25 μm; it may have a thickness of at most 70 μm, preferably at most 55 μm, or more preferably at most 45 μm.

These values of paint thickness offer a good compromise between offering a good mechanical and chemical resistance to the mirror and an acceptable cost of production.

Traces of silane may be present at the surface of the silver coating layer which is provided adjacent to the paint layer covering the silver coating layer. The treatment of the silver coating layer with a silane before painting may enhance and/or contribute towards the resistance of the mirror to abrasion and/or corrosion.

The thickness of the mirror may be greater than 0.5 mm or 0.9 mm; it may be less than 2 mm or 1.5 mm; it may preferably be around 0.95 or 1.25 mm. Such thin and flexible mirrors may be used in applications were curved reflectors are needed. When flat reflectors are used, or for domestic use, the thickness of the mirror may be greater than 2 mm or 2.5 mm; it may be less than 12, 10, 8, 6 or 5 mm. Thinner mirrors are generally advantageous in that they offer higher RE.

Preferably, the silver coating layer of the mirror has a thickness of at least 800 Å, at least 900 Å, more preferably at least 1000 Å, at least 1100 Å, or at least 1200 Å, still more preferably at least 1300 Å; its thickness may be less than 2200 Å, preferably less than 2000 Å, more preferably less than 1800 Å. These values offer a good compromise between a good light or energetic reflectance value and an acceptable cost of production. It is known that an increased thickness of the silver coating layer reduces the quantity of UV radiation transmitted to the paint layers. However, due to the fact that the paint layers according to the present invention are less sensitive to UV radiation, a thinner silver layer may be used, which is cost effective.

Preferably, the glass substrate of the mirror is made of extra-clear glass, i.e. a glass with a total iron content expressed as $Fe_2O_3$ of less than 0.02% by weight. Such glass preferably shows an energetic transmission (TE) of at least 90% for a 4-mm thick glass, when measured according to ISO 9050. This may favour the energetic reflectance (RE) of the mirror. However an extra-clear glass will also transmit more UV radiation towards the paint layers. The present invention, which uses less UV-sensitive paints, may thus provide the benefit of combining high RE (with extra-clear glass) and less paint degradation.

Mirrors according to the present invention are preferably mirrored by wet chemical process, i.e. a process wherein the glass substrate is contacted by a silver solution to form the silver coating layer.

Advantageously, one or more material may be deposited during an activating step on the surface of the glass substrate on which the silver layer is to be deposited (the rear surface); this may contribute to the corrosion resistance of the mirror. Such material may be selected from the group consisting of bismuth, chromium, gold, indium, nickel, palladium, platinum, rhodium, ruthenium, titanium, vanadium and zinc. Palladium is preferred. Tin may be provided at or on the surface of the glass substrate on which the silver layer is to be deposited; this may sensitise the glass substrate and may facilitate adhesion of the silver layer thereto. Preferably, one or more material(s) may be deposited during a passivating step on the surface of the silver coating layer on which the paint layer is to be deposited; this may contribute to the corrosion resistance of the mirror. Such material may be selected from the group consisting of tin, palladium, vanadium, titanium, iron, indium, copper, aluminium chromium, lanthanum, nickel, europium, zinc, platinum, ruthenium, rhodium, sodium, zirconium, yttrium and cerium. Tin and palladium are preferred.

Materials provided at the surface of the glass substrate during an activating and/or sensitising step and/or at the surface of the silver layer during a passivating step are preferably provided as islets, that is to say that preferably they do not produce a distinct continuous layer of, for example, palladium, but that the material is in the form of islets on the surface of the glass.

In methods of manufacturing mirrors according to certain aspects of the invention, sensitising, activating and passivating steps may contribute to the ageing and/or corrosion resistance of the mirrors and/or to their durability. Preferably, the solutions brought into contact with the glass substrate during the successive manufacturing steps are sprayed onto the glass substrate with optional intervening rinsing and/or washing steps. For example, during the industrial manufacture of flat mirrors, sheets of glass may pass through successive stations where sensitisation, activation, silvering and passivating reagents are sprayed. In practice, on a mirror production line, the sheets of glass are generally conveyed along a path by a roller conveyor. They are first of all polished and rinsed prior to being sensitised by means for example of a tin chloride solution sprayed on the glass; they are then rinsed again. An activating solution is then sprayed onto the sheets of glass; this activating solution may be for example, an acidic aqueous solution of $PdCl_2$. The sheets of glass then pass to a rinsing station where demineralised water is sprayed, and then to the silvering station where a traditional silvering solution is sprayed, the silvering solution being combined upon application to the glass from two separately sprayed solutions, one solution comprising a silver salt and either a reducing agent or a base and the other solution comprising whichever component (a reducing agent or a base) which is absent from the solution containing the silver salt. The flow rate and concentration of the silvering solution sprayed onto the glass are controlled so as to form a layer of silver of a desired thickness over substantially the whole surface of the glass sheet, for example containing between 800 and 2200 $mg/m^2$ of silver, preferably in the range 900-1800 $mg/m^2$ of silver. The glass is then rinsed and directly after the rinsing of the silver coating, an aqueous solution of for example $SnCl_2$ is sprayed onto the silvered glass sheets as they move forward along the conveyor. After a further rinsing, the mirrors may then be treated by spraying with a solution containing a silane. After rinsing and drying, the mirrors are covered with two or more paint layers. The paint is then cured or dried, for example in a tunnel oven. Preferably, the paint is applied onto the silvered substrates in the form of a continuous curtain of liquid paint falling onto the glass sheets in a curtain coating process.

The finished mirror may have an energy reflection (RE) according to standard ISO 9050:2003 of greater than 92%, preferably greater than 93%. The energy reflection may be less than 98% or less than 97%.

Embodiments of the invention will now be further described, by way of example only, with reference to examples 1 to 3. Comparative examples 1 to 8, not in accordance with the invention, are also given.

EXAMPLES AND COMPARATIVE EXAMPLES

In all the examples and comparative examples, various mirrors, with a silver coating layer of around 1200 Å thickness, were manufactured on a 4 mm thick extra-clear glass CLEARVISION from the company AGC Glass Europe. 10 cm×10 cm square samples from these mirrors were submitted to various tests (defined hereunder), some directly after having been cut, others after having been edge worked (rounded edge profile obtained after grinding). All the examples and comparative examples differ only by their paint layers number and/or composition, as shown in Tables I and II. In all the examples and comparative examples the thickness of each paint layer is around 30 µm, except in comparative example 8 for which approximate paints thicknesses are given in Table II-c.

CASS Test

Resistance to ageing and/or corrosion of mirrors may be defined with reference to the CASS test, i.e. copper-accelerated acetic acid salt spray test. In that test the mirror is placed in a testing chamber at 50° C. and is subjected to the action of a fog formed by spraying an aqueous solution containing 50 g/l sodium chloride, 0.26 g/l anhydrous cuprous chloride with sufficient glacial acetic acid to bring the pH of the sprayed solution to between 3.1 and 3.3. Full details of this test are set out in International Standard ISO 9227-1990. The CASS test is performed on 10 cm square mirror tiles, and after exposure to the copper-accelerated acetic acid salt spray for 5, 10, 15, 20 or more days, each tile is subjected to microscopic examination. The principal visible evidence of corrosion is a darkening of the silver layer of the mirror around its margins. The extent of corrosion is measured in micrometers at five regularly spaced sites on each of two opposed edges of the tile and the mean average of these ten measurements is calculated.

Q-Panel

The Q-panel test is used to simulate the deterioration caused by sunlight. Full details of this test are set out in ASTM Standard G53-88. Samples are exposed to ultraviolet light. The exposure conditions used herein are: UVA lamp at 340 nm; power of UV lamp: 0.8 $W/m^2$ at 340 nm-40 $W/m^2$ at 300-400 nm; timing of the UV exposure: 2500 hours/cycle; temperature of UV exposure: 60° C.; no condensation exposure was performed. RE of the mirrors is measured before and after each cycle of exposure. The loss in RE is calculated after exposure and expressed in %.

Thermal Cycling+Humidity

This test is used to simulate the climatic conditions of desert environments where days are hot and nights cold. Samples are subjected 4 times per day to a change of temperature from −20° C. to 75° C., then to −20° C. again, in a humid atmosphere with a humidity rate greater than 98%. Each test cycle comprises 42 days. After each cycle, the samples are observed, in particular to measure the average corrosion and to check if the paint peels off or not. If the results are good, the sample is placed again in the same conditions for one or more additional cycle(s).

Q-Panel+CASS Test

This test combines the Q-panel and CASS test successively. Samples are first subjected to a Q-panel test of 2500 hours, then to a CASS test of 5 days. Such cycle may be reproduced several times. After each cycle, the samples are observed, in particular to check the integrity of the paint.

Damp Heat Test

In this test, the samples are placed in an atmosphere at 85° C., with a humidity rate of 85%, for a duration of 30 days per cycle. Such test is described in IEC Standard No 61215. After each cycle, the samples are observed, in particular to check the integrity of the paint.

The results of the tests are shown in Table I for examples 1 to 3, and in Table II-a, -b, -c for comparative examples 1 to 8.

These results show the advantages of combining a polyurethane resin based outermost paint layer and paint layers free of alkyd resin, together with a thickness for the first paint layer of at least 10 µm. Mirrors with such a combination resist to the thermal cycling+humidity test (252 days), to the Q-panel+CASS test (at least 3 cycles) and the samples with three layers of paint resist to the Damp heat test (90 days). The sample with two layers of paint (example 1) does not resist to the Damp heat test (90 days), but well to the others. This mean that such a mirror is very good in terms of ageing properties, but not so good as the mirrors with three layers of paint. Such observation may further be generalised: mirrors with three layers of paint generally show better ageing properties, longer lifetime and increased corrosion and mechanical resistance than mirrors with two layers of paint.

All the comparative examples, which are not part of the invention because either they include alkyd paint or they do not have a polyurethane resin based outermost paint layer or they have a first paint layer closest to the silver layer which is too thin, show, for example, paint peeling and paint delamination after the thermal cycling+humidity test, the Q-panel+CASS test or the Damp heat test. They have thus unacceptable problems arising with ageing.

TABLE I

| | | Example 1 | Exemple 2a | Exemple 2b | Exemple 3a | Exemple 3b |
|---|---|---|---|---|---|---|
| | | | number of paint layers | | | |
| | | 2 layers | 3 layers | | 3 layers | |
| | | | types of paint layers | | | |
| | | Acryl/PU | Acryl/Acryl/PU | | Acryl/Acryl/PU | |
| | | | quality of samples' edges | | | |
| | | cut | edge worked | cut | edge worked | cut |
| CASS Test average corrosion [μm] | 5 days | 140 | <50 | 114 | <50 | 152 |
| | 25 days | | | | | |
| | 45 days | 517 | <150 | 376 | <150 | 407 |
| Q-Panel loss of RE [%] | 2500 h | 0 | 0 | 0 | 0 | 0 |
| | 5000 h | 0.1 | 0.1 | 0.1 | 0.1 | 0.1 |
| Thermal cycling + humidity | −20° C. to 75° C. (>98% HR) 4x/day | 252 days: A corrosion 1000 μm | 252 days: OK/A corrosion <500 μm | | 252 days: OK/A corrosion <500 μm | |
| Q-panel + CASS Test | Q-panel 2500 h + CASS Test 5 days | 3 cycles: paint OK | 3 cycles: paint OK | | 3 cycles: paint OK | |
| Damp heat test | 85° C./85 HR % | 90 days: KO Peeling: 2 mm + haze | 90 days: A/B 500 μm + haze | | 90 days: A 500 μm | |

OK = OK
A = acceptable
B = borderline
U = unacceptable
KO = destroyed

TABLE II-a

| | | Comp Ex 1 | Comp Ex 2 | Comp Ex 3a | Comp Ex 3b |
|---|---|---|---|---|---|
| | number of paint layers | 2 layers | 2 layers | 3 layers | |
| | types of paint layers | Alkyd/Alkyd | Alkyd/Acryl | Alkyd/Alkyd/Alkyd | |
| | quality of samples' edges | cut | cut | edge worked | cut |
| CASS Test average corrosion [μm] | 5 days | 122 | 295 | <50 | 138 |
| | 25 days | | 693 | | |
| | 45 days | 540 | | 160 | 650-700 |
| Q-Panel loss of RE [%] | 2500 h | 0 | | 0 | 0 |
| | 5000 h | 0.9 | | 0.4 | 0.4 |
| Thermal cycling + humidity | −20° C. to 75° C. (>98% HR) 4x/day | 168 days: KO paint peeling 2-3 mm | 126 days: KO paint peeling > 1 mm | 126 days: KO paint peeling 2-3 mm | |
| Q-panel + CASS Test | Q-panel 2500 h + CASS Test 5 days | 2 cycles: KO complete paint delamination | | 2 cycles: KO complete paint delamination | |
| Damp heat test | 85° C./85 HR % | 60 days: KO complete paint delamination | | 60 days: KO complete paint delamination | |

OK = OK
A = acceptable
B = borderline
U = unacceptable
KO = destroyed

TABLE II-b

| | | Comp Ex 4a | Comp Ex 4b | Comp Ex 5 | Comp Ex 6 |
|---|---|---|---|---|---|
| | number of paint layers | 3 layers | | 3 layers | 3 layers |
| | types of paint layers | Alkyd/Alkyd/Acryl | | alkyd/alkyd/PU | alkyd/acryl/PU |
| | quality of samples' edges | edge worked | cut | cut | cut |
| CASS Test average | 5 days | <100 | 129 | 170 | 322 |
| | 25 days | | | 458 | 385 |

TABLE II-b-continued

|  |  | Comp Ex 4a | Comp Ex 4b | Comp Ex 5 | Comp Ex 6 |
|---|---|---|---|---|---|
| corrosion [µm] | 45 days | 230 | 570 | 717 |  |
| Q-Panel loss of RE [%] | 2500 h | 0.5 | 0.5 | 0.88 |  |
|  | 5000 h | 3.3 | 3.3 | 7.42 |  |
| Thermal cycling + humidity | −20° C. to 75° C. (>98% HR) 4x/day | 84 days: KO paint peeling 2-3 mm | 84 days: KO paint peeling 2-3 mm | 42 days: KO paint peeling > 1 mm | 126 days: KO paint peeling > 1 mm |
| Q-panel + CASS Test | Q-panel 2500 h + CASS Test 5 days |  | 2 cycles: KO complete paint delamination | 2 cycles: KO complete paint delamination |  |
| Damp heat test | 85° C./85 HR % |  |  |  |  |

TABLE II-c

|  |  | Comp Ex 7 | Comp Ex 8 |
|---|---|---|---|
|  | number of paint layers | 3 layers | 2 layers |
|  | types of paint layers | Acryl/Acryl/Acryl | Acryl [5 µm]/PU [30 µm] |
|  | quality of samples' edges | cut | cut |
| CASS Test | 5 days | 214 | 482 + punctual defects |
| average corrosion [µm] | 25 days | 365 | 2000 + punctual defects |
|  | 45 days |  |  |
| Q-Panel loss of RE [%] | 2500 h |  |  |
|  | 5000 h |  |  |
| Thermal cycling + humidity | −20° C. to 75° C. (>98% HR) 4x/day | 126 days: OK/A corrosion ~500 µm |  |
| Q-panel + CASS Test | Q-panel 2500 h + CASS Test 5 days | 2 cycles: KO complete paint delamination |  |
| Damp heat test | 85° C./85 HR % |  |  |

The invention claimed is:

1. A mirror, comprising:
   a glass substrate,
   a silver coating layer at a surface of the glass substrate, and
   at least two paint layers covering the silver coating layer, wherein
   the at least two paint layers are free of alkyd resin,
   an outermost paint layer comprises a polyurethane resin based paint,
   at least one paint layer between the silver coating layer and the outermost paint layer comprises an acrylic resin based paint,
   a paint layer closest to the silver coating layer has a thickness of at least 10 µm, the mirror is free of any copper layer, and
   the mirror can withstand 3 cycles of both a 2500 hour Q-panel test as defined in ASTM Standard G53-88 and a 5-day CASS test as defined in International Standard ISO 9227-1990 without complete paint delamination.

2. The mirror of claim 1, wherein the mirror comprises three paint layers.

3. The mirror of claim 1, wherein the mirror comprises, in an order of covering the silver coating layer:
   a first paint layer comprising an acrylic resin based paint,
   a second paint layer comprising an acrylic resin based paint, and
   the outermost paint layer comprising a polyurethane resin based paint.

4. The mirror of claim 1, wherein the mirror comprises, in an order of covering the silver coating layer:
   a first paint layer comprising an acrylic resin based paint,
   a second paint layer comprising an epoxy resin based paint, and
   the outermost paint layer comprising a polyurethane resin based paint.

5. The mirror of claim 1, wherein the silver coating layer has a thickness of at least 1000 Å.

6. The mirror of claim 1, wherein
   the mirror comprises two paint layers,
   a first paint layer has a thickness of from 20 to 45 µm, and
   the outermost paint layer has a thickness of from 25 to 50 µm.

7. The mirror of claim 2, wherein
   a first paint layer, closest to the silver coating layer, has a thickness of from 20 to 45 µm,
   a second paint layer, between the first paint layer and the outermost paint layer, has a thickness of from 20 to 45 µm, and
   the outermost paint layer has a thickness of from 25 to 50 µm.

8. The mirror of claim 1, wherein the glass substrate is an extra-clear glass with a total iron content expressed as $Fe_2O_3$ of less than 0.02% by weight.

9. A mirror, comprising:
   a glass substrate,
   a silver coating layer at a surface of the glass substrate, and
   at least two paint layers covering the silver coating layer, wherein
the at least two paint layers are free of alkyd resin,
an innermost paint layer is in direct contact with the silver layer,
an outermost paint layer comprises a polyurethane resin based paint,
at least one paint layer between the silver coating layer and the outermost paint layer comprises an acrylic resin based paint,
a paint layer closest to the silver coating layer has a thickness of at least 10 μm,
the mirror is free of any copper layer, and
the mirror can withstand 3 cycles of both a 2500 hour Q-panel test as defined in ASTM Standard G53-88 and a 5-day CASS test as defined in International Standard ISO 9227-1990 without complete paint delamination.

10. The mirror of claim 9, wherein the mirror comprises three paint layers.

11. The mirror of claim 9, wherein the mirror comprises, in an order of covering the silver coating layer:
the innermost paint layer comprising an acrylic resin based paint,
a second paint layer comprising an acrylic resin based paint, and
the outermost paint layer comprising a polyurethane resin based paint.

12. The mirror of claim 9, wherein the mirror comprises, in an order of covering the silver coating layer:
the innermost paint layer comprising an acrylic resin based paint,
a second paint layer comprising an epoxy resin based paint, and
the outermost paint layer comprising a polyurethane resin based paint.

13. The mirror of claim 9, wherein the silver coating layer has a thickness of at least 1000 Å.

14. The mirror of claim 9, wherein the mirror has only two paint layers and
the innermost paint layer has a thickness of from 20 to 45 μm, and
the outermost paint layer has a thickness of from 25 to 50 μm.

15. The mirror of claim 10, wherein
the innermost paint layer has a thickness of from 20 to 45 μm,
a second paint layer, between the first paint layer and the outermost paint layer, has a thickness of from 20 to 45 μm, and
the outermost paint layer has a thickness of from 25 to 50 μm.

16. The mirror of claim 9, wherein the glass substrate is an extra-clear glass with a total iron content expressed as $Fe_2O_3$ of less than 0.02% by weight.

17. The minor of claim 1, wherein the mirror can withstand a thermal cycling plus humidity test of 4 cycles per day between −20° C. to 75° C. and back to 20° C. under greater than 98% relative humidity for 252 days and exhibit paint peeling of less than 1 mm.

* * * * *